US009059536B2

(12) United States Patent
 Tseng (10) Patent No.: US 9,059,536 B2
(45) Date of Patent: Jun. 16, 2015

(54) DOOR MECHANISM ASSEMBLY (71) Applicant: GIGA-BYTE TECHNOLOGY CO., LTD., New Taipei (TW)

(72) Inventor: Po Hsiang Tseng, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 162 days.

(21) Appl. No.: 13/926,807

(22) Filed: Jun. 25, 2013

(65) Prior Publication Data

US 2014/0308830 A1    Oct. 16, 2014

(30) Foreign Application Priority Data

Apr. 12, 2013 (TW) .............................. 102113171 A (51) Int. Cl.
 *H01R 13/44* (2006.01)
 *H01R 13/52* (2006.01)
 *H04Q 1/02* (2006.01)
(52) U.S. Cl.
 CPC ........... *H01R 13/5213* (2013.01); *H04Q 1/026* (2013.01)
(58) Field of Classification Search
 CPC ...... H01R 35/04; H01R 23/025; H01R 31/06; H01R 13/60; H01R 2201/06; H01R 13/447; H01R 13/5213
 USPC ........................................... 439/131, 136, 38
 See application file for complete search history.

(56) References Cited

U.S. PATENT DOCUMENTS

| 4,773,870 | A | * | 9/1988 | Sinnig ........................... 439/136 |
| 5,020,997 | A | * | 6/1991 | Calderara et al. ............. 439/137 |
| 5,179,504 | A | * | 1/1993 | Kitahara .................. 361/679.31 |
| 5,224,869 | A | * | 7/1993 | Lee ................ 439/136 |
| 5,408,459 | A | * | 4/1995 | Kawaguchi et al. ........... 720/647 |
| 5,768,241 | A | * | 6/1998 | Kanazawa et al. ............. 720/647 |
| 6,059,583 | A | * | 5/2000 | Croft et al. ..................... 439/131 |
| 6,093,039 | A | * | 7/2000 | Lord ............................. 439/155 |
| 6,233,215 | B1 | * | 5/2001 | Paul et al. ..................... 720/647 |
| 7,837,484 | B2 | * | 11/2010 | Wu .............................. 439/136 |
| 2013/0017696 | A1 | | 1/2013 | Alvarez Rivera | |

* cited by examiner

*Primary Examiner* — Abdullah Riyami
*Assistant Examiner* — Vladimir Imas
(74) *Attorney, Agent, or Firm* — Chun-Ming Shih (57) ABSTRACT

A door mechanism assembly includes a movable unit and a door unit. The movable unit is disposed in a housing of an electronic device and is for carrying an electronic connector corresponding to an opening on the housing. The door unit is disposed in the housing and can open or cover the opening. The movable unit includes a first magnetic member, and the door mechanism assembly includes a second magnetic member. The first and second magnetic members are repulsive with each other. The door unit normally covers the opening, so as to protect the electronic connector. When the movable unit moves near the door unit, the door unit will be pushed away from the opening by the repulsive magnetic force, such that the electrical connector will be exposed in the opening and that the electrical connector provides an electrical connection function.

9 Claims, 6 Drawing Sheets

DOOR MECHANISM ASSEMBLY

CROSS-REFERENCES TO RELATED APPLICATIONS

This non-provisional application claims priority under 35 U.S.C. §119(a) on Patent Application No. 102113171 filed in Taiwan, R.O.C. on 2013 Apr. 12, the entire contents of which are hereby incorporated by reference.

BACKGROUND

1. Technical Field

This disclosure relates to a door mechanism assembly, and more particularly to a door mechanism assembly of an electronic device.

2. Related Art

Universal Serial Bus (USB) is a connection interface with hot swap function, which is convenient to use by inserting USB ports and has become a standard connection interface which is required by most electronic devices. The drivers of USB ports have been standardized, and most computers have the drivers of USB. Therefore, users can use USB ports by inserting USB ports into the corresponding connection interface of the computer without additional installation. The scalability and the flexibility of USB make USB become widely used in various fields.

General electronic devices, such as keyboards, personal digital processor, or handheld computer products, all include at least one USB connector, so as to connect to other electronic devices and fulfill the data transmission function. Currently, electronic connectors of most electronic devices are exposed design. And electronic connectors have non-closed connection interface, so dust and dirt are easy to be stuck in electronic connectors, resulting in short circuit or fault of the connection interface, such that the system is unable to recognize the devices, which is very inconvenient. Therefore, protection covers or protection plugs for preventing dust or dirt from entering USB connectors have existed on the markets.

However, these kinds of protection covers or protection plugs are usually independent, so they are easy to be detached from the USB ports and thus to be lost. This situation often happens, which makes the protection function of electronic connector impaired and consumers unwilling to use.

Therefore, how to make the electronic connectors of electronic devices have covering protection with convenient operation method is the R & D focus of manufactures.

SUMMARY OF THIS DISCLOSURE

In view of the above problems, this disclosure provides a door mechanism assembly, so as to solve the issue that electronic connectors of conventional electronic devices are exposed design and connectors have non-closed connection interface, so dust or dirt are easy to be stuck in the connection interface, resulting in short circuit or fault of the connection interface.

The door mechanism assembly applies to an electronic device, and the electronic device includes a housing and an electronic connector. The housing includes an opening and a guide groove. The door mechanism assembly includes a movable unit and a door unit. The movable unit is disposed in the housing and includes a body, a first magnetic member, and a push rod. The electronic connector is disposed in the body, and a connection interface of the electronic connector corresponds to the opening. The first magnetic member is disposed in the body. One end of the push rod is connected to the body, and the other end of the push rod stretches into the guide groove and is able to move to and fro along the guide groove. The body is driven by the push rod to move from a first position toward the opening to a second position. The door unit includes a cover panel and a second magnetic member. The cover panel covers the opening of the housing and is able to move to and fro between a closed position and an opened position relative to the housing. The cover panel covers the opening at the closed position, and the opening is exposed when the cover panel is at the opened position. The second magnetic member is disposed on the cover panel, and the first magnetic member is magnetically repulsive to the second magnetic member. When the body of the movable unit moves to the second position, the relative positions of the first magnetic member and the second magnetic member overlap, and thus a magnetic force is generated. Then the magnetic force pushes the cover panel to the opened position, and the connection interface of the electronic connector is exposed in the opening.

By disposing object such as magnetic members respectively in the body and the cover panel, the door panel can be opened like an automatic door, so as to be electronically connected to other electronic device conveniently, or to make the door panel closed, so as to prevent dust or dirt from being stuck on the connection interface of the electronic connector. Therefore, the connection interface is protected, the life of the electronic device is extended, and the appearance of the electronic device becomes more integrally.

The detail of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THE DISCLOSURE

Figure 1:
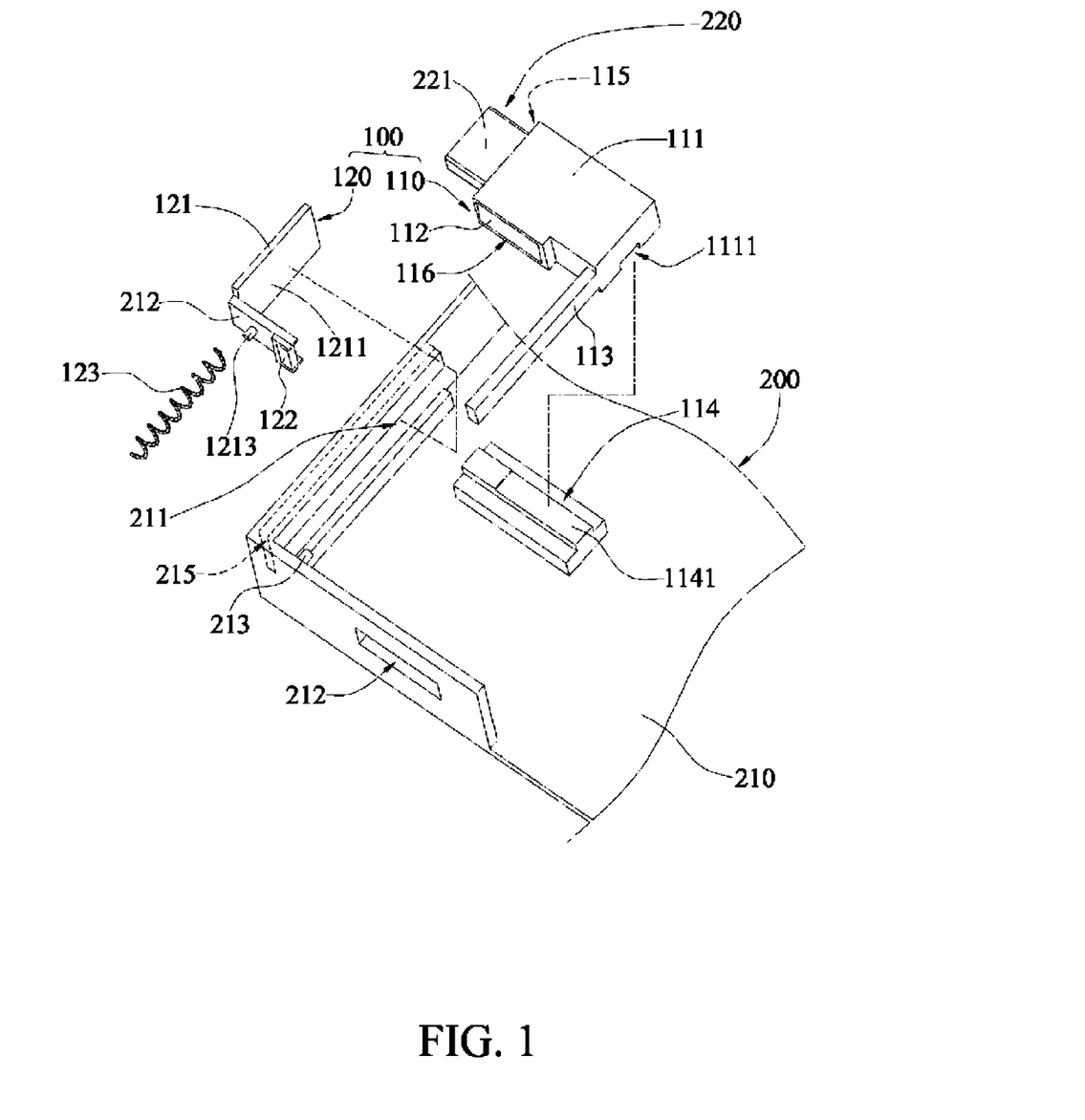
FIG. 1 is an exploded view of the door mechanism assembly according a first embodiment.
Figure 2:
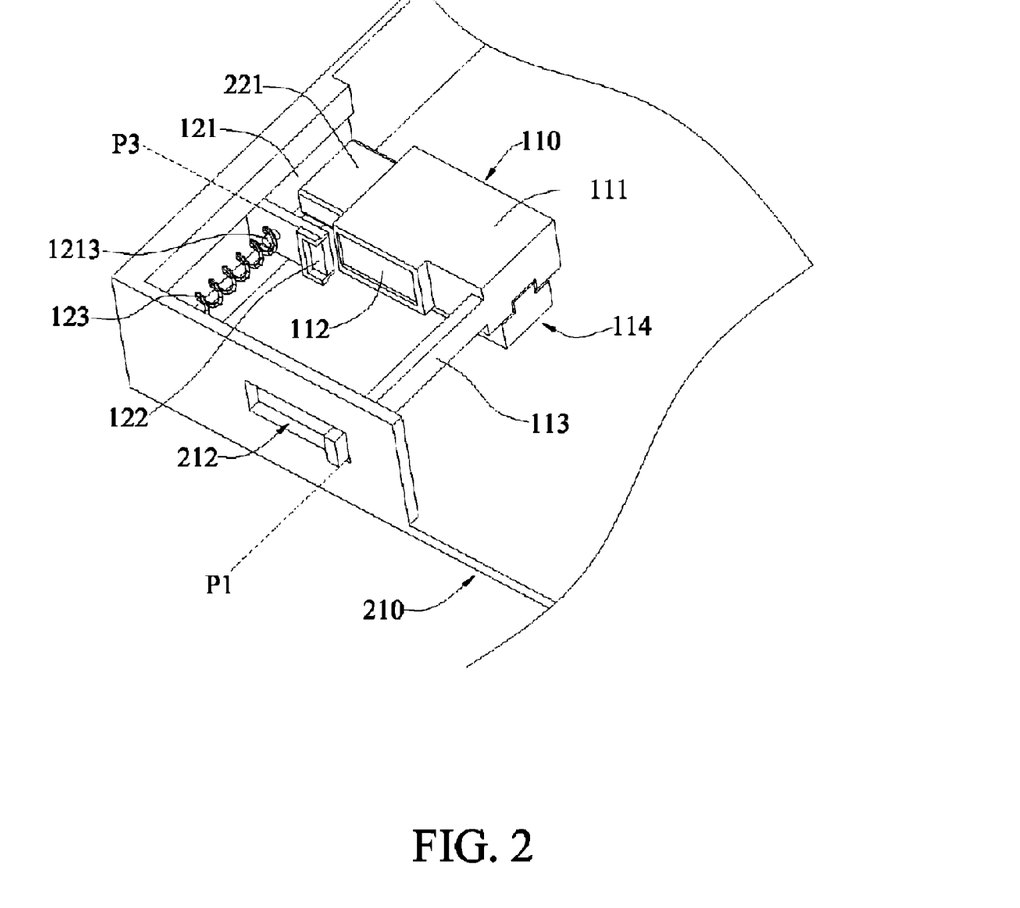
FIG. 2 is a perspective view of the door mechanism assembly according to the first embodiment.

Refer to FIG. 1 and FIG. 2, the door mechanism assembly 100 according to the first embodiment is disposed in the electronic device 200, so as to cover the connection interface, such as electronic connector or electronic port, of the connector 220. The electronic device 200 includes a housing 210 and an electronic connector 220. The connection interface of electronic connector 220 includes but not limits to Universal Serial Bus (USB), High-Definition Multimedia Interface (HDMI), or Video Graphics Array (VGA). Besides, the housing 210 includes an opening 211 and a guide groove 212. The following will describe the configuration of the electronic connector 220, door mechanism assembly 100, and the housing 210.

The door mechanism assembly 100 includes a movable unit 110 and a door unit 120. The movable unit 110 is disposed in the housing 210 of the electronic device 200, and the movable unit 110 includes a body 111, a first magnetic member 112, and a push rod 113. The body 111 includes an accommodation slot 115 and an embedment slot 116 respectively corresponding to the opening 211 and the guide groove 212 of the housing 210. The electronic connector 220 is disposed in the accommodation slot 115, a connection interface 221 of the electronic connector 220 corresponds to the opening 211, and the first magnetic member 112 is embedded in the embedment slot 116.

Figure 3:
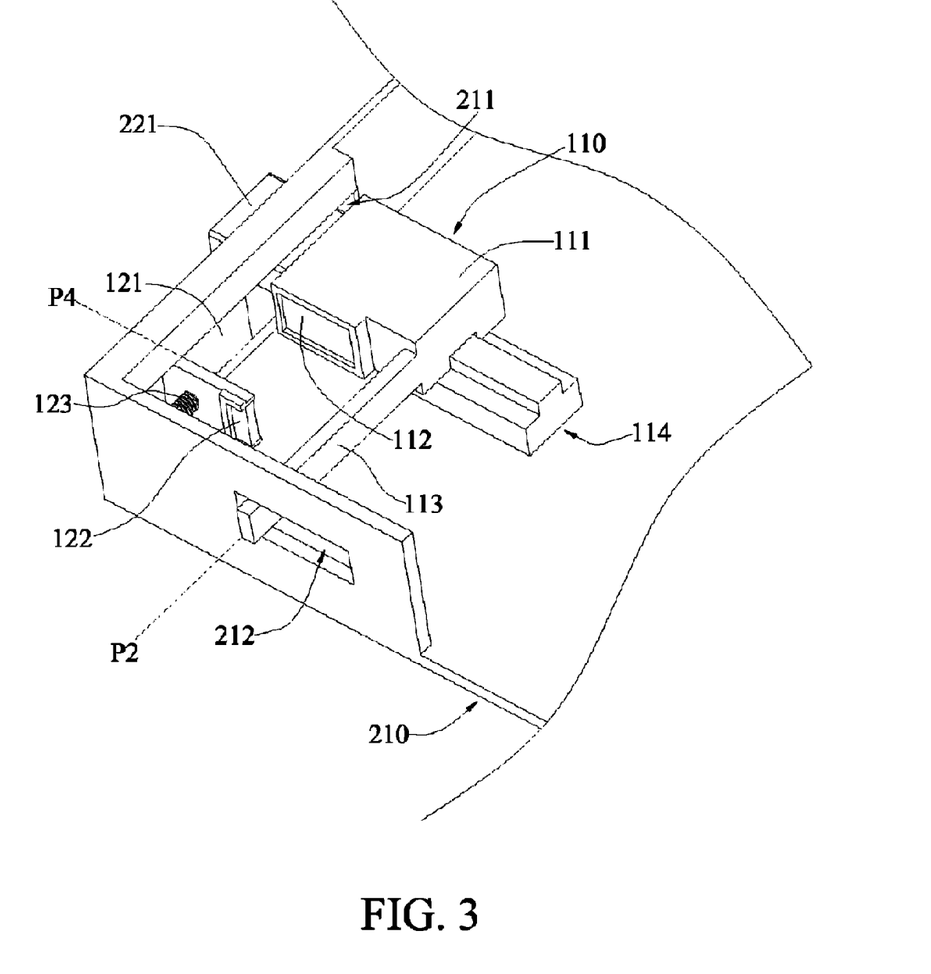
FIG. 3 is a perspective view of the door mechanism assembly illustrating the actuation according to the first embodiment.

Refer to FIG. 1 to FIG. 3, one end of the push rod 113 is connected to the body 111, and the other end of the push rod 113 stretches into the guide groove 212, with part of the push rod 113 exposed outside the housing 210, such that users can move the push rod 113 and that the body 111 is driven by the push rod 113. Therefore, the body 111 is able to moves to and fro along the guide groove 212, that is, the body moves from a first position P1 which is far from the opening 211 to a second position P2 which is near the opening 211. When the body 111 moves to the second position P2, the connection interface 221 of the electronic connector 220 is exposed in the opening 211, or protrudes outside the opening 211.

The door unit 120 includes a cover panel 121 and a second magnetic member 122. The cover panel 121 includes a covering portion 1211 and a pushing portion 1212. One end of the pushing portion 1212 is connected to the covering portion 1211, and the other end of the pushing portion 1212 extends along the movable unit 110, such that the cover panel 121 is an L-shaped structure, not limited as described herein. The second magnetic member 122 is embedded in the end extending toward movable unit 110 of the pushing portion 1212. The first magnetic member 112 is repulsive to the second magnetic member 122, so when the first magnetic member 112 is near the second magnetic member 122, or when the relative positions of the first magnetic member 112 and the second magnetic member 122 overlap, the two will generate repulsive magnetic force. The first magnetic member 112 and the second magnetic member 122 includes but not limit to permanent magnet, non-permanent magnet, or electromagnet.

A trench 215 is disposed in the inner surface adjacent to the opening 211 of the housing 210, and the width is a little larger than the thickness of the covering portion 1211 of the cover panel 121, such that the cover panel 121 of the door unit 120 is able to stuck in the trench 215 by the covering portion 1211 and to slide in the trench 215 and that the door unit 120 is able to move to and fro along the trench 215 between a closed position P3 and an opened position P4. The door unit 120 is normally at the closed position P3 and covers the opening 211 by the covering portion 1211 of the cover panel 121. When the push rod 113 is at the first position P1, the cover panel 121 is normally at the closed position P3 and covers the opening 211, such that the connection interface 221 of the electronic connector 220 is covered by the cover panel 121, for preventing dust or dirt from being stuck on the connection interface 221 through the opening 211. Therefore, the connection interface 221 is protected.

When the push rod 113 moves along the guide groove 212 and drives the body 111 to move toward the opening 211 and to the second position P2, the relative positions of the first magnetic member 112 of the body 111 and the second magnetic member 122 of the door unit 120 overlap. When the first magnetic member 112 moves along with the body 111 and is near the second magnetic member 122, a repulsive magnetic force will be formed between the two. The repulsive magnetic force will be applied to the pushing portion 1212 of the cover panel 121, and the cover panel 121 is pushed and moves toward the direction away from movable unit 110 and to the opened position P4, such that the covering portion 1211 of the cover panel 121 is away from the opening 211 and that the opening 211 is exposed at the housing 210. At the same time, the connection interface 211 of the electronic connector 220 is exposed at the housing 210 through the opening 211 or protrudes the housing 210, so that the electronic device 200 can be electronically connected to other electronic product by the connection interface 221.

The door unit 120 further includes an elastic member 123, which can be compression springs, elastic foams, or other components that are elastic. In this embodiment, the elastic member 123 is compression springs, not limited as described herein. For coordinating the disposition of the elastic member 123, a convex pillar 1213 is further disposed in the pushing portion 1212 of the cover panel 121, and a positioning pillar 213 is disposed on the side surface in the housing 210. The position of the positioning pillar 213 corresponds the position of the convex pillar 1213, and the two ends of the elastic member 123 are respectively sleeved over the convex pillar 1213 and the positioning pillar 213, such that the elastic member 123 is able to be fixed between the pushing portion 1212 and the housing 210.

When the magnetic force pushes the cover panel 121 to the opened position P4, the two ends of the elastic member 123 respectively withstand the pushing portion 1212 and the inner surface of the housing 210, such that the elastic member 123 is compressed by the extrusion of the pushing portion 1212 and that an elastic force is generated. Therefore, when the push rod 113 is moved back to the first position P1, the first magnetic member 112 and the second magnetic member 122 leaves with each other and thus the repulsive magnetic force disappears, and the cover panel 121 returns to the closed position P3 through the elastic force of elastic member 123, such that the cover panel 121 covers the opening 211 again. This design makes the opening opened or closed along with the position of the body 111, which is very convenient for users.

For a better operability, the movable unit 110 further includes a pair of rails 114. The rails 114 are disposed in the housing 210 and extend toward the opening 211. The top surface of the rails 114 includes a sticking structure 1141, and the sticking structure 1141 can be but not limits to convex ribs. The bottom surface of the body 111 includes a corresponding structure 1111, and the corresponding structure 1111 can be but not limit to groove, such that the body 111 can be combined with the sticking structure 1141 of the rails 114 by the corresponding structure 1111. By the concave-convex fitting structure, the body 111 is able to reciprocate smoothly between the first position P1 and the second position P2, and the electronic connector 220 is easier to be positioned with the opening 211 while assembling. Besides, the situation that connection interface 221 deviates from the opening 211 due to external force can be avoided, so that the positioning function is achieved and the operability is enhanced.

Figure 4:
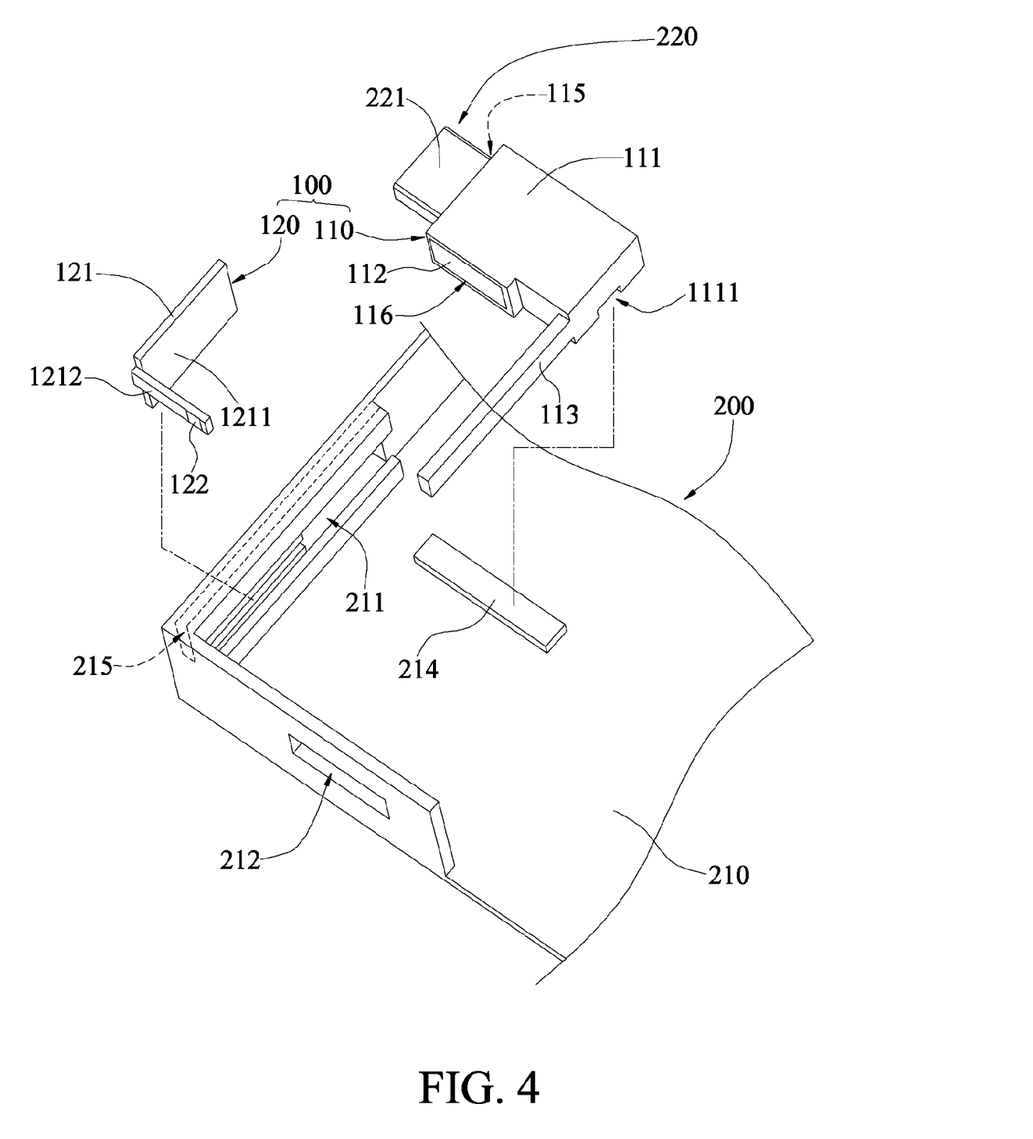
FIG. 4 is an exploded view of the door mechanism assembly according to a second embodiment.
Figure 5:
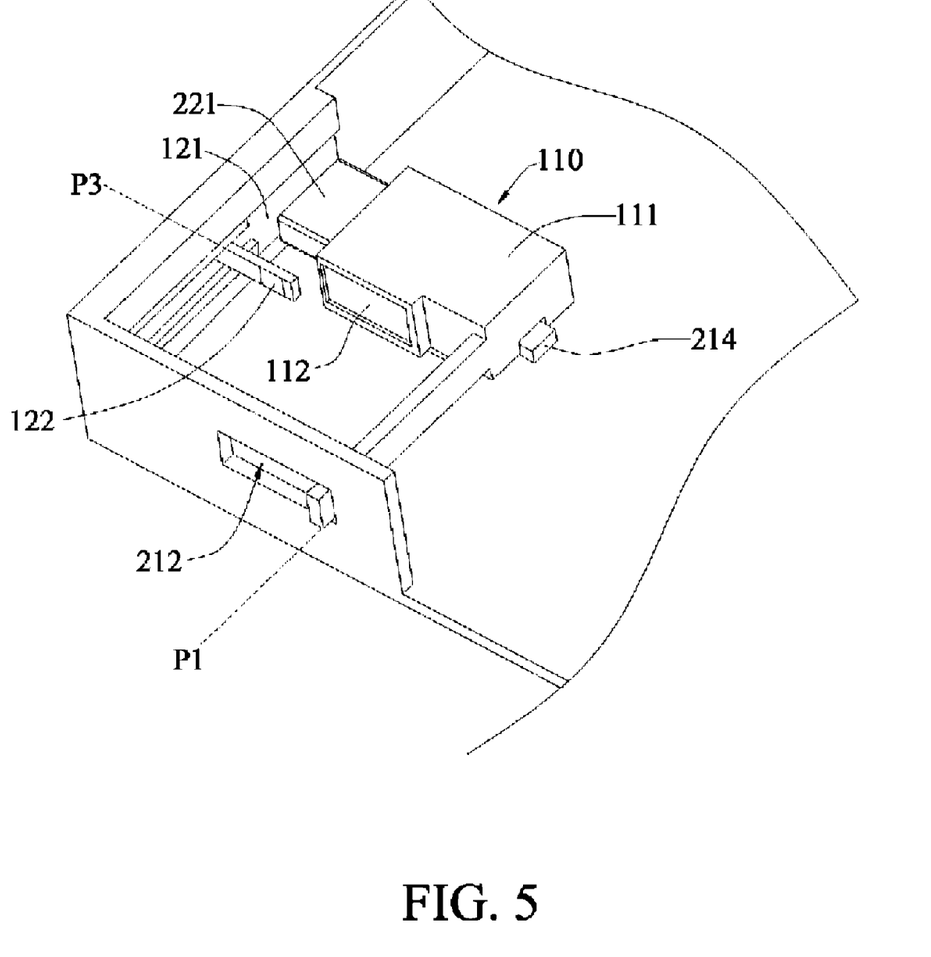
FIG. 5 is a perspective view of the door mechanism assembly according to the second embodiment.

Refer to FIG. 4 and FIG. 5, the overall structure of the door mechanism assembly 100 according to the second embodiment is similar to that according to the first embodiment. The following describes the difference between the two.

The opening 211 of the housing 210 according to the second embodiment includes a limiting section extending toward the guide groove 212, and the trench 215 of the housing 210 is disposed one side adjacent to the opening 211 on the outer surface of the housing 210. About the configuration of the door unit 120, the cover panel 121 of the door unit 120 includes a covering portion 1211 and a pushing portion 1212. One end of the pushing portion 1212 is connected to the covering portion 1211, and the width of the pushing portion 1212 is smaller than the width of the covering portion 1211. The width of the pushing portion 1212 matches the limiting section communicating the opening 211.

Figure 6:
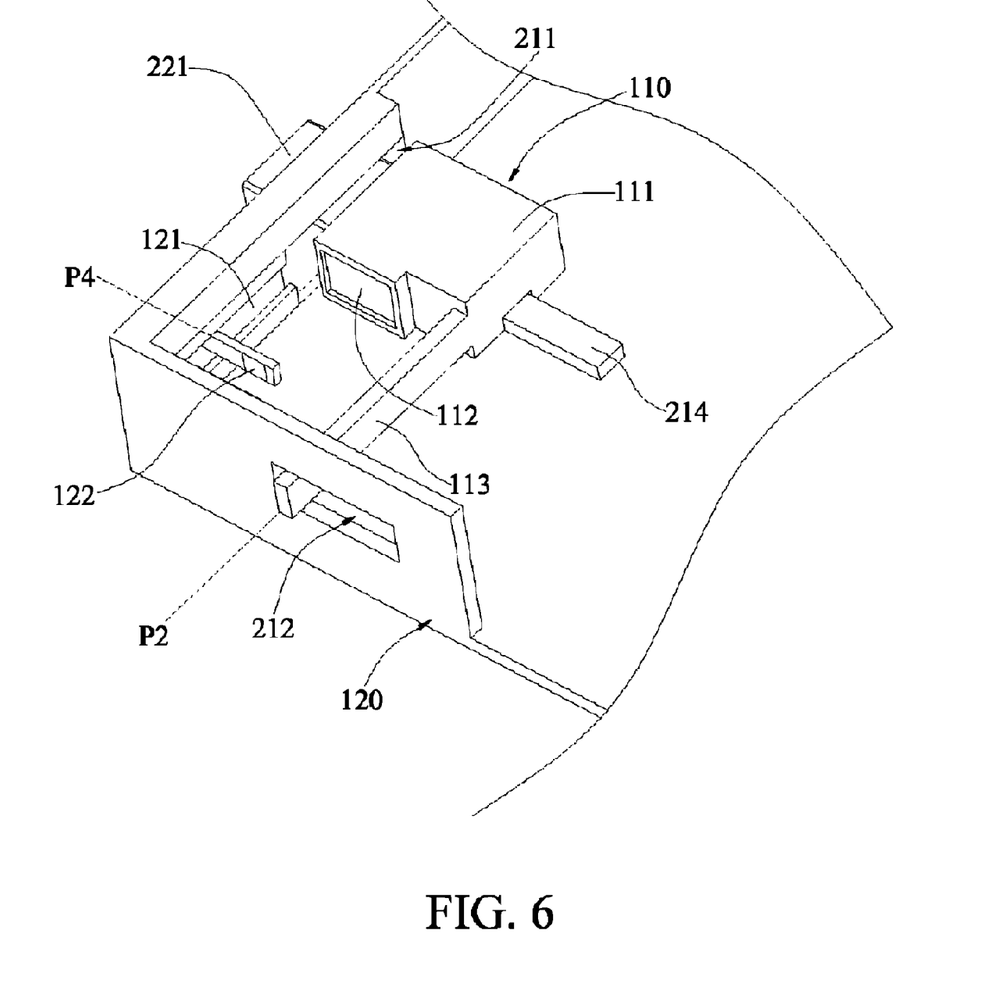
FIG. 6 is a perspective view of the door mechanism assembly illustrating the actuation according to the second embodiment.

Refer to FIG. 4 to FIG. 6. Because the trench 215 is disposed on the outer surface of the housing 210, about the assembling of the door unit 120, the pushing portion 1212 of the cover panel 121 is passed through the limiting section of the opening 211, and then the pushing portion 1212 stretches into the trench 215, such that the covering portion 1211 normally covers the opening 211 outside the housing 210. Therefore, users can use their fingers to move the covering portion 1211 of the cover panel 121, such that the pushing portion 1212 slides in the limiting section and that the door unit 120 is able to reciprocate along the trench 215 between a closed position P3 and an opened position P4.

For a better operability, a positioning structure 214 can be selectively disposed in the housing 210. The positioning structure 214 can be but not limits to a convex rib. A corresponding structure 1111 is disposed on the bottom surface of the body 111 of the movable unit 110. The corresponding structure 214 can be but not limits to a groove. The corresponding structure 1111 of the body 111 is combined with the positioning structure 214 of the housing 210 in a concave-convex fitting manner, and the body 111 is able to reciprocate smoothly between the first position P1 and the second position P2. Besides, the electronic connector 220 is easier to be positioned while assembling, and the situation that the electronic connector deviates from the opening 211 is avoided, so that the positioning function is achieved and the operability is enhanced.

People having ordinary skill in the art can make proper modification to the door mechanism assembly 100 according to the actual needs or design requirements, not limited as described herein.

Through the configuration of the door unit, the opening is able to be opened or closed, and the issue that electronic connectors of conventional electronic devices are exposed design and connectors have non-closed connection interface, so dust or dirt are easy to be stuck in the connection interface, resulting in short circuit or fault of the connection interface is solved.

Compared with the prior art, the door mechanism assembly uses the design of magnetic members respectively disposed in the body of the movable unit and the cover panel of the door unit, such that the cover panel can be opened automatically by the repulsive magnetic force, which is very convenient. Besides, if combined with the disposition of the elastic member, the door unit will further has automatic close function, and the cover panel of the door unit covers the opening more stably, so as to avoid dust or dirt being stuck in the connection interface. Therefore, the connection interface is protected, the life of the electronic device is extended, and the appearance of the electronic device becomes more integrally. Besides, this disclosure simplifies connecting mechanism which uses linkage in conventional door mechanism assembly. In addition to a lower manufacturing cost of the cover structure, this disclosure can be applied to a compact electronic device with limited internal space, which makes the disclosure very useful.

Though the embodiments of this disclosure are disclosed as described above, this is not to limit this disclosure. People having ordinary skill in the art will recognize that this disclosure can be practiced with modification within the spirit and scope of the claim. It is therefore to be understood that this disclosure is not to be limited by the foregoing description but only by the appended claims.

What is claimed is:

1. A door mechanism assembly, applying to an electronic device, wherein the electronic device includes a housing and an electronic connector, and the housing includes an opening and a guide groove, including:
   a movable unit, disposed in the housing, wherein the movable unit includes a body, a first magnetic member, and a push rod, the electronic connector is disposed in the body, a connection interface of the electronic connector corresponds to the opening, the first magnetic member is disposed in the body, one end of the push rod is connected to the body, the other end of the push rod stretches into the guide groove and is able to move to and from along the guide groove, and the body is driven by the push rod to move from a first position toward the opening to a second position; and
   a door unit, including a cover panel and a second magnetic member, wherein the cover panel is able to move to and from between a closed position and an opened position relative to the housing, the cover panel covers the opening at the closed position, the opening is exposed when the cover panel is at the opened position, the second magnetic member is disposed on the cover panel, and the first magnetic member is magnetically repulsive to the second magnetic member;
   wherein when the body of the movable unit moves to the second position, the relative positions of the first magnetic member and the second magnetic member overlap and thus a magnetic force is generated, the magnetic force pushes the cover panel to the opened position, and the connection interface of the electronic connector is exposed in the opening.

2. The door mechanism assembly as claimed in claim 1, wherein the cover panel of the door unit includes a covering portion and a pushing portion, the covering portion covers the opening, the pushing portion is connected to the covering portion and stretches toward the movable unit, and the second magnetic member is disposed in the end adjacent to the movable unit of the pushing portion.

3. The door mechanism assembly as claimed in claim 2, wherein the door unit further includes an elastic member, and the elastic member is connected between the pushing portion and the housing.

4. The door mechanism assembly as claimed in claim 3, wherein the pushing portion of the cover panel includes a convex pillar, the housing includes a positioning pillar, and the two ends of the elastic member are respectively sleeved over the convex pillar and the positioning pillar.

5. The door mechanism assembly as claimed in claim 1, wherein a positioning structure is disposed in the housing, the body of the movable unit includes a corresponding structure, the corresponding structure bump ties with the positioning structure, and the positioning structure guide the body to move to and from between the first position and the second position.

6. The door mechanism assembly as claimed in claim 1, wherein the movable unit further includes a pair of rails, the rails is disposed in the housing and stretches toward the opening, and the body is disposed on the rails and is able to move to and from between the first position and the second position.

7. The door mechanism assembly as claimed in claim 6, wherein the body has a corresponding structure, the rails has a sticking structure, the corresponding structure is combined with the sticking structure, and the corresponding structure bump ties with the sticking structure.

8. The door mechanism assembly as claimed in claim 1, wherein the body of the movable unit has an accommodation slot and an embedment slot respectively corresponding to the opening of the body and the guide groove, and the electronic connector and the first magnetic member are respectively disposed in the accommodation slot and the embedment slot.

9. The door mechanism assembly as claimed in claim 1, wherein a trench is disposed on one side surface adjacent the opening of the housing, the cover panel of the door unit is stuck in the trench and moves to and from between the opened position and the closed position.

* * * * *